Figure 1:
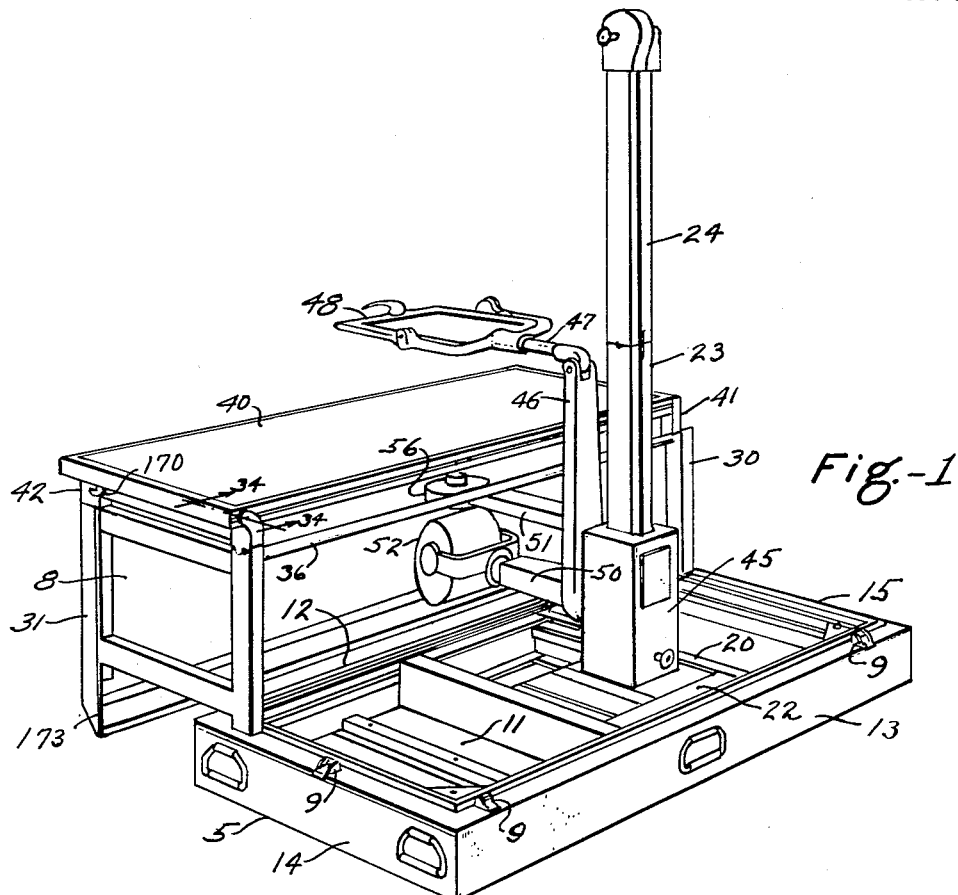

July 10, 1956 R. C. SCHIRING ET AL 2,754,426
DEMOUNTABLE X-RAY APPARATUS
Filed Nov. 15, 1951 9 Sheets-Sheet 1

INVENTORS
RALPH C. SCHIRING
ANTHONY J. FODERARO
By Bates, Teare & McBean
ATTORNEYS

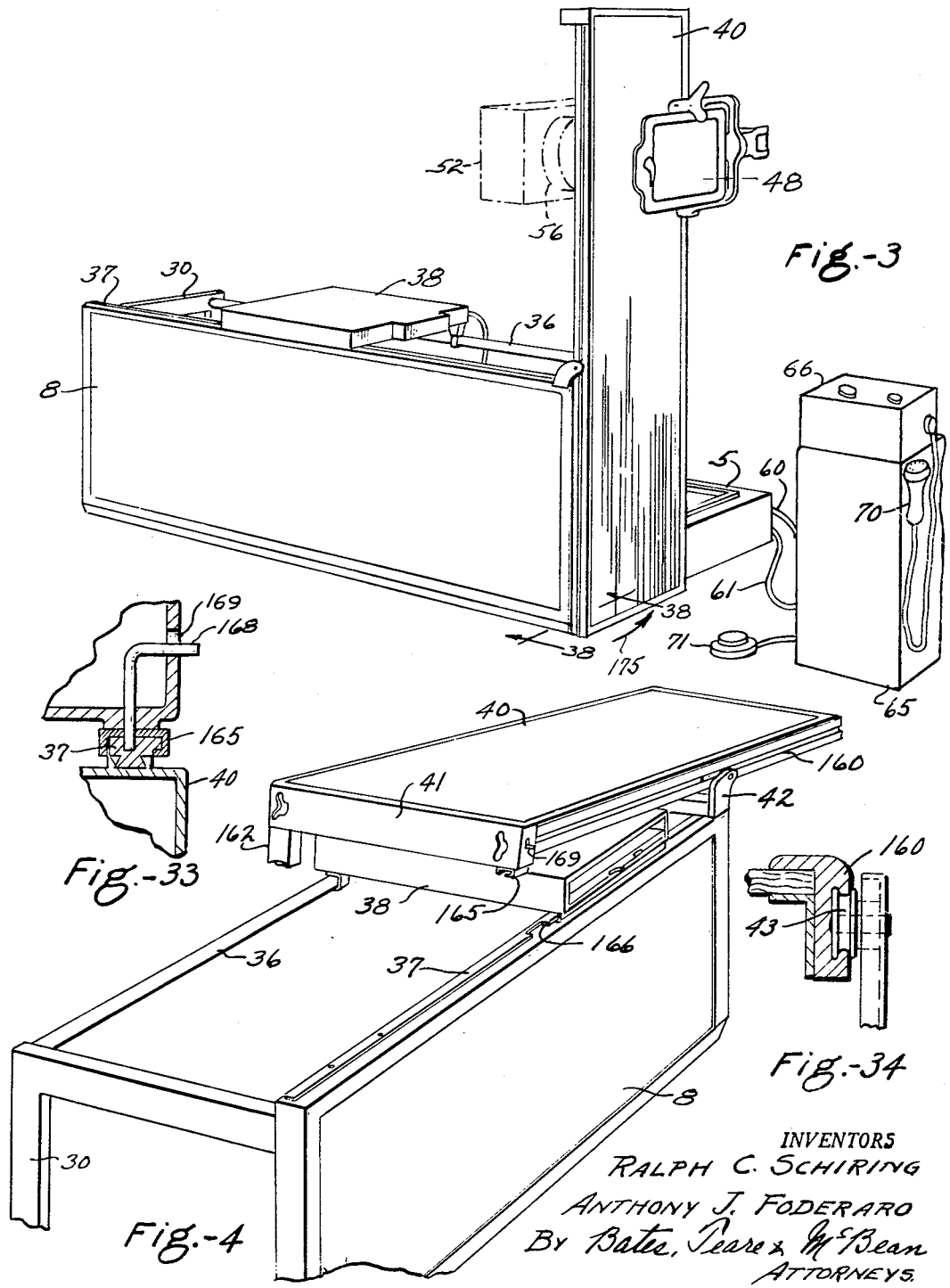

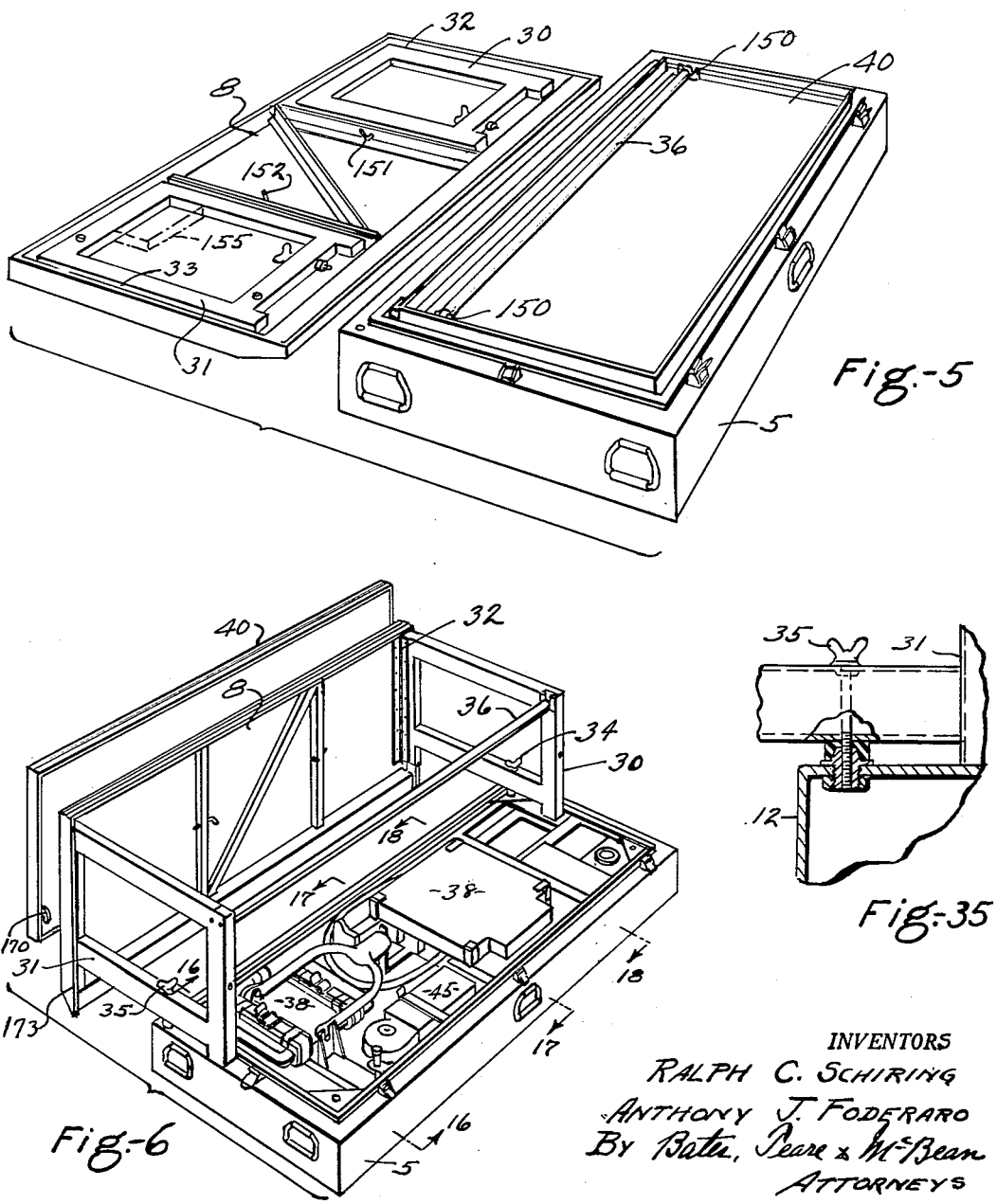

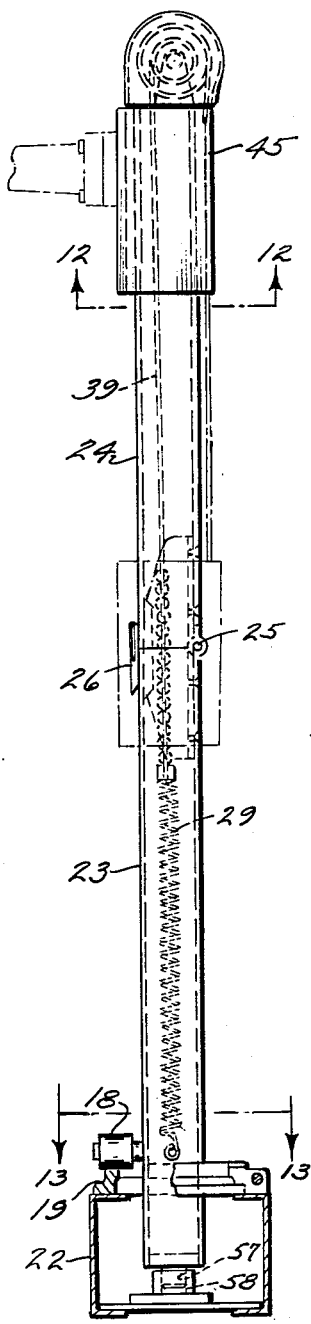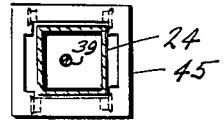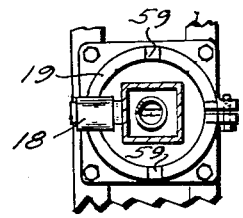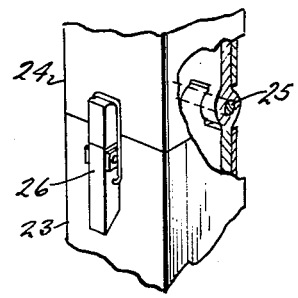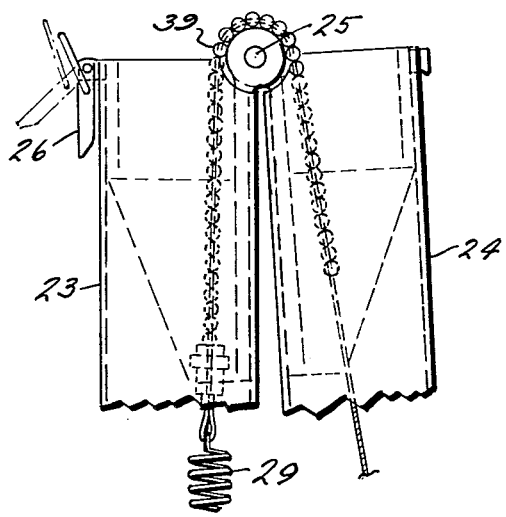

INVENTORS
RALPH C. SCHIRING
ANTHONY J. FODERARO
BY Bates, Teare & McBean
ATTORNEYS.

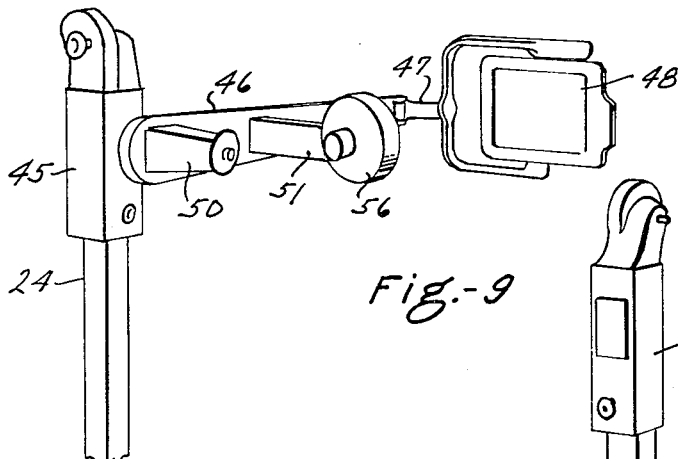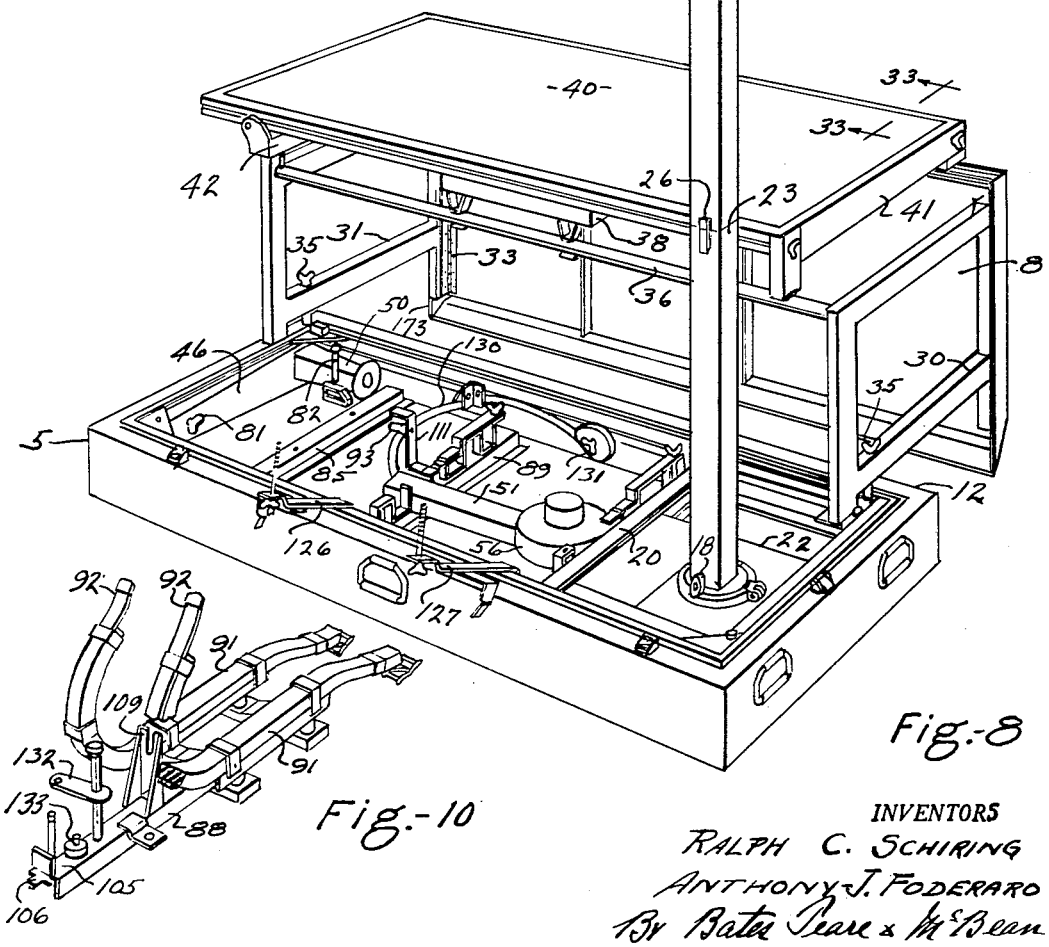

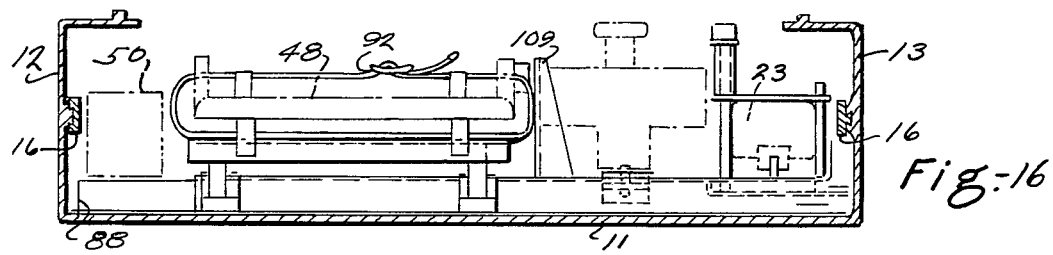
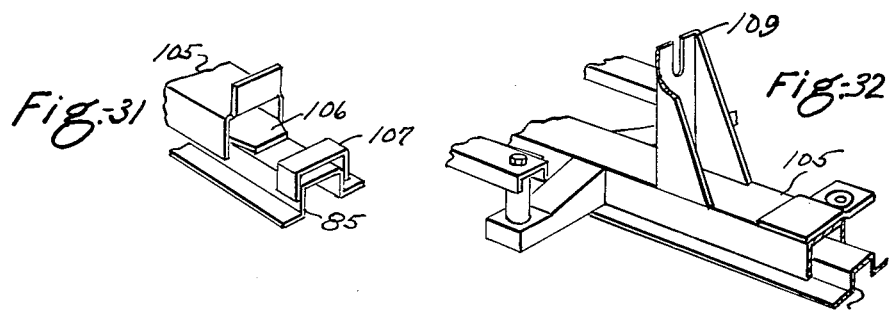
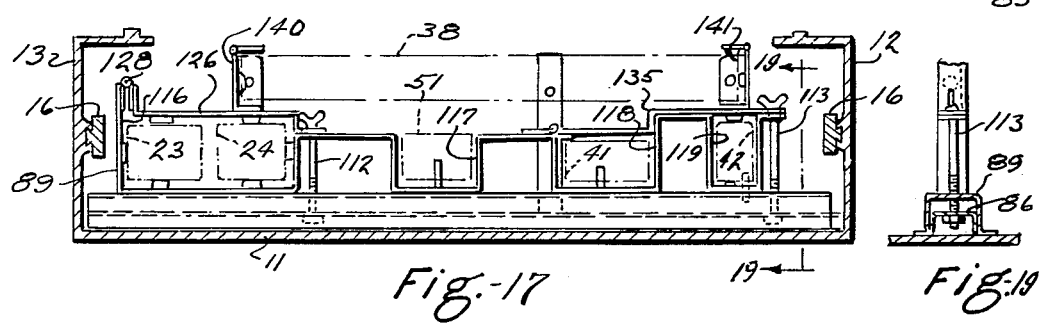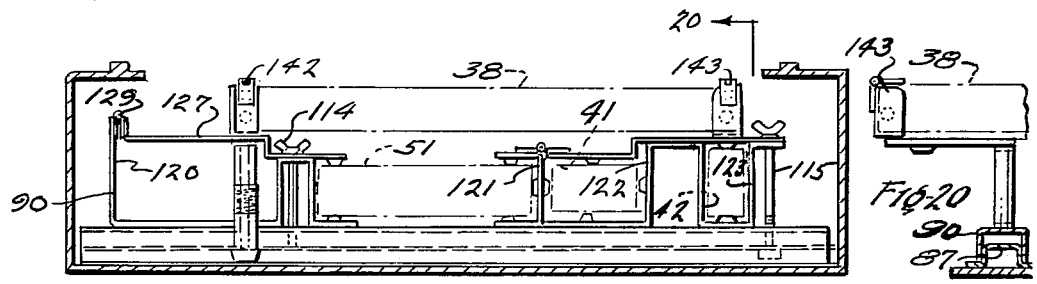

INVENTORS
RALPH C. SCHIRING
ANTHONY J. FODERARO
By Bates, Teare & McBean
ATTORNEYS July 10, 1956 R. C. SCHIRING ET AL 2,754,426
DEMOUNTABLE X-RAY APPARATUS
Filed Nov. 15, 1951 9 Sheets-Sheet 9

INVENTORS
RALPH C. SCHIRING
ANTHONY J. FODERARO
By Bates, Peare & McBean
Attorneys United States Patent Office 2,754,426
Patented July 10, 1956

2,754,426

DEMOUNTABLE X-RAY APPARATUS

Ralph C. Schiring, Shaker Heights, and Anthony J. Foderaro, Cleveland, Ohio, assignors to Picker X-Ray Corporation, Cleveland, Ohio, a corporation of Ohio Application November 15, 1951, Serial No. 256,468

7 Claims. (Cl. 250—57)

This invention relates to X-ray apparatus and particularly to apparatus that is especially suited, although not limited, to military use.

One of the most serious draw-backs to the use of X-ray equipment for military use is the weight and size of the table and associated equipment. There is a great demand, however, for the construction of a portable X-ray unit which is capable of satisfactory use, either for fluoroscopic or for radiographic examination, and which is sufficiently light in weight and compact that it can be transported readily and quickly set up for use directly behind battle lines in any location. All equipment heretofore devised for such purpose has been packed in too many separate containers, and has been inadequate from the viewpoint of satisfying the requirements of the medical field services with proper diagnostic X-ray equipment. In particular the equipment lacked a full-length rigid table and was incapable of use for vertical fluoroscopy.

The principal object of the present invention is to make a demountable X-ray unit which, when demounted, is sufficiently compact that it can readily be handled and transported and thereafter can be quickly set up in any location for immediate use. The invention additionally contemplates a construction which is light in weight yet which is sufficiently rigid when assembled to permit the use of the table, either in horizontal or vertical position, and for either fluoroscopy or radiography.

The invention is carried out preferably by utilizing a box-like base which forms a support for a collapsible table and which comprises a support for the tube stand, allowing movement of the stand longitudinally as well as transversely of the table. The box is so made that the tube stand, screen arm and supporting structure therefor, as well as the screen and table, may be compactly stored within the base and closed by a portion of the table, so that the entire assembly assumes a trunk or chest-like appearance. The tube, the control equipment, and accessories may then be mounted in a separate chest, whereby there is provided a self-contained X-ray unit which is well adapted, though not especially limited, to field use.

Figure 2:
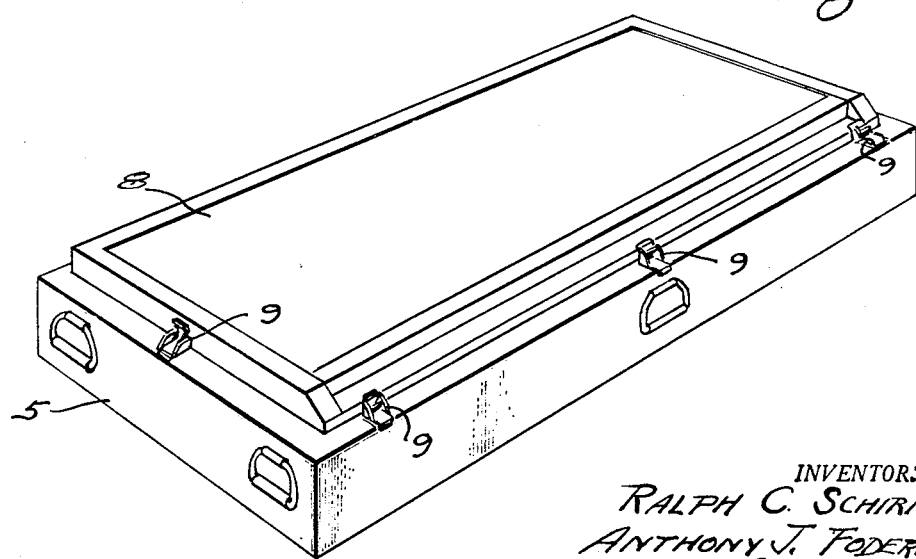
Figure 7:
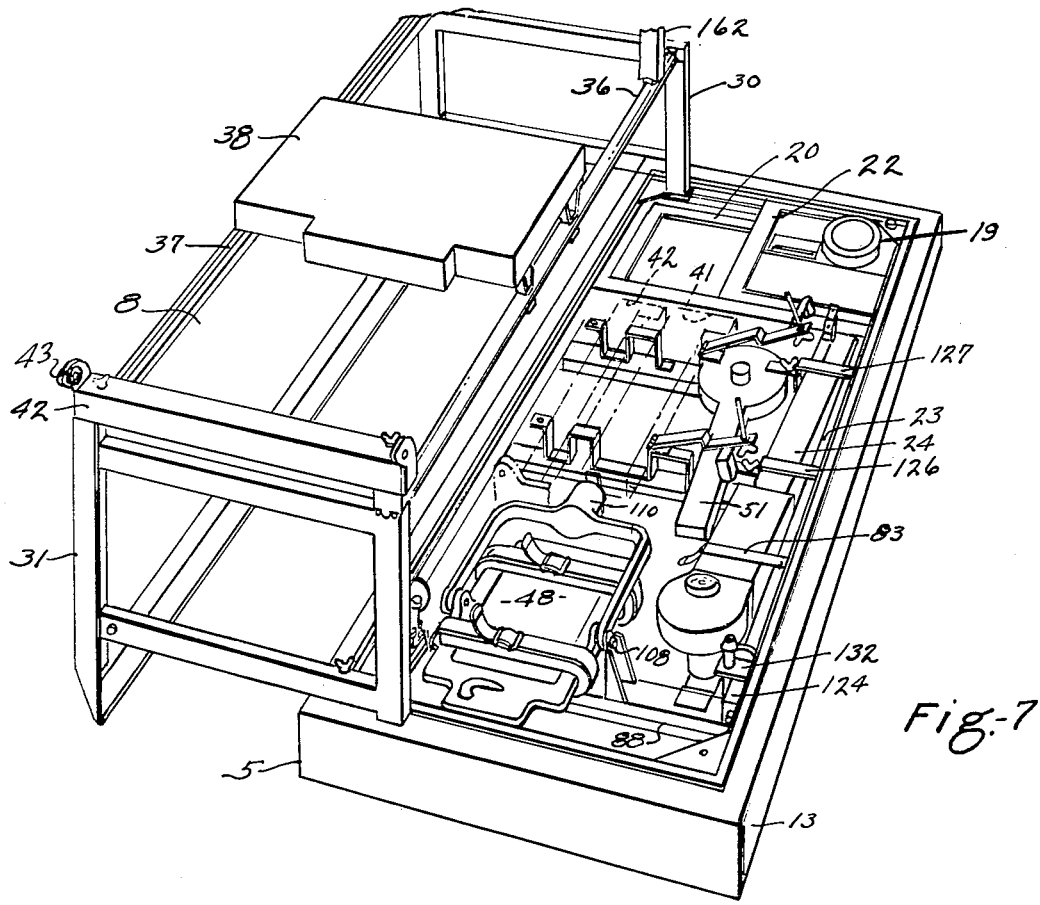
Figure 21:
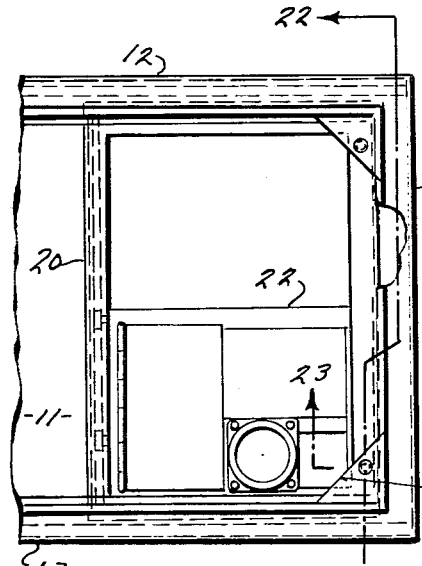
Figure 22:
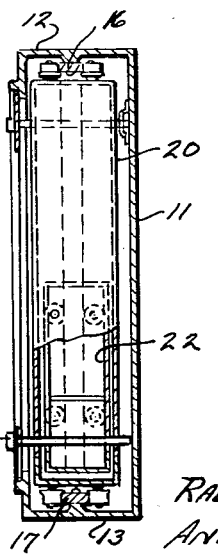
Figure 23:
Figure 24:
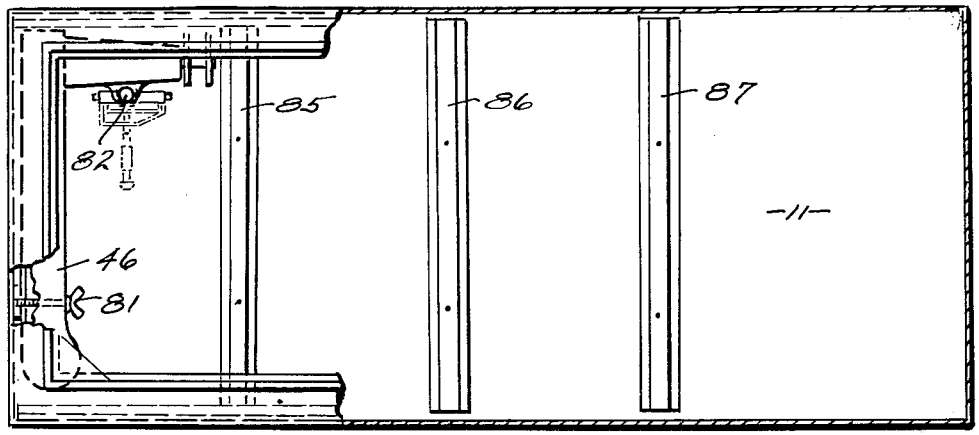
Figure 25:
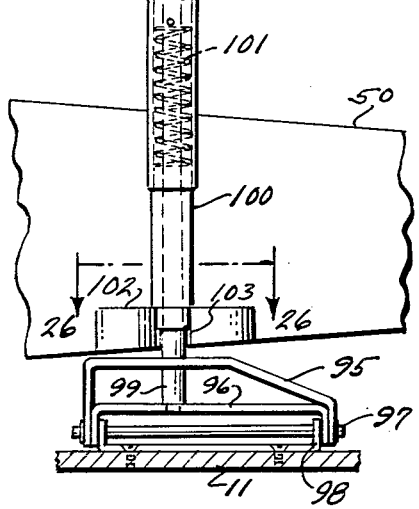
Figures 29, 30:
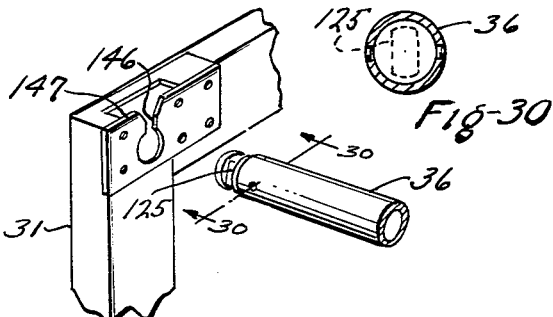
Figure 27:
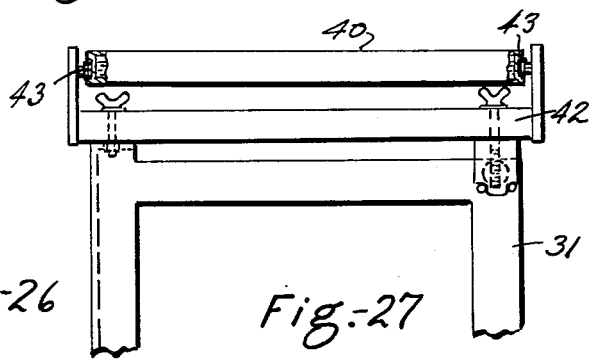
Figure 26:
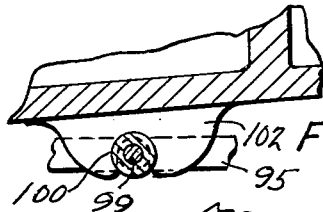
Figure 28:
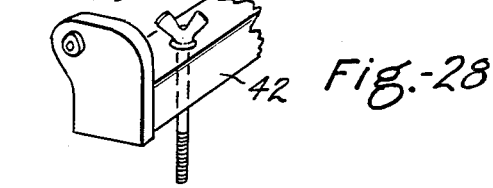
Figure 36:
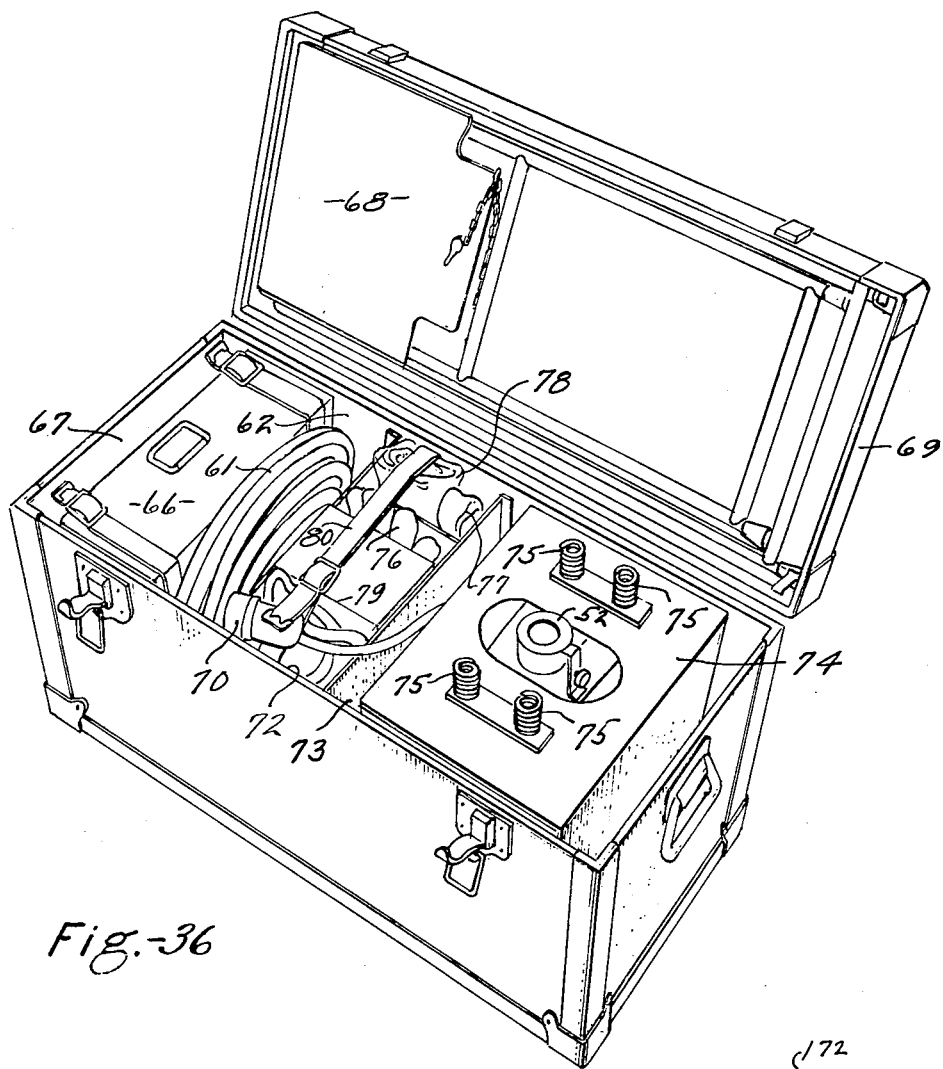
Figure 37:
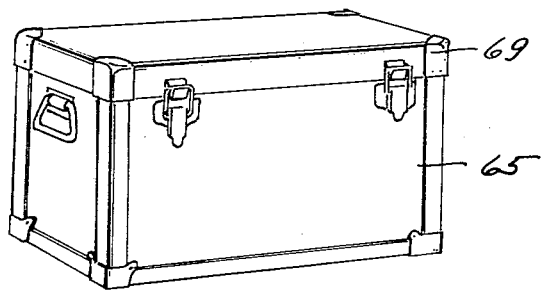
Figure 38:
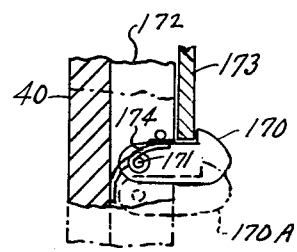

Referring to the drawings, Fig. 1 is a perspective view of an X-ray table and tube stand in assembled position; Fig. 2 is a perspective view of the unit in closed position; Fig. 3 is a perspective view illustrating the table in a position for vertical fluoroscopy; Fig. 4 is a perspective view showing the position of the table top during the tilting operation; Fig. 5 is a perspective view showing one of the first steps in assembling the table; Fig. 6 is a perspective view showing a subsequent step in the assembly; Figs. 7, 8 and 9 are perspective views showing other subsequent steps in the assembly; Fig. 10 is a perspective view illustrating one of the packing supports, or battens, utilized for clamping some of the parts within the base; Fig. 11 is a vertical section taken through the tube stand support, showing the mast in side elevation; Figs. 12 and 13 are sections taken on the correspondingly numbered lines in Fig. 11; Fig. 14 is a partial view in side elevation illustrating the mast in folded position; Fig. 15 is a perspective view partially broken away illustrating a portion of the mast adjacent the hinged joint with the sections in extended position; Figs. 16, 17 and 18 are vertical sections taken on planes indicated by the correspondingly numbered lines in Fig. 6; Figs. 19 and 20 are sections taken on the correspondingly numbered lines in Figs. 17 and 18 respectively; Fig. 21 is a top plan view illustrating a portion of the base with the tube stand carriage positioned therein; Figs. 22 and 23 are sections taken on planes indicated by the correspondingly numbered lines in Fig. 21; Fig. 24 is a top plan view of the base, partly in section, and illustrating the packing assembly in the end opposite to that shown in Fig. 21; Fig. 25 is a side elevation of a clamping device illustrated in Fig. 24 but taken on a scale larger than that of Fig. 24; Fig. 26 is a section taken on a plane indicated by the line 26—26 in Fig. 25; Fig. 27 is an end view partially in section of the table in assembled position; Fig. 28 is a perspective view illustrating a portion of the foot-end table supporting member; Fig. 29 is a perspective view illustrating the connection between the bucky rail and the leg frame of the table; Fig. 30 is a vertical section taken on a plane indicated by the line 30—30 in Fig. 29; Fig. 31 is a perspective view showing a portion of the screen batten; Fig. 32 is a perspective view of another portion of the screen batten; Fig. 33 is a vertical section through a portion of the table top and support therefor, taken on a plane indicated by the line 33—33 in Fig. 8; Fig. 34 is a vertical section taken on a plane indicated by the line 34—34 in Fig. 1; Fig. 35 is a side elevation partly in section of the connection between the leg rail and base; Fig. 36 is a perspective view of an open trunk or chest, having the tube head, the control and accessories stored therein; Fig. 37 is a perspective view of the closed trunk, and Fig. 38 is a section taken on the line 38—38 of Fig. 3.

In the drawings, Fig. 1 shows the assembled X-ray unit with the head and screen in position for horizontal fluoroscopy, whereas, Fig. 3 illustrates the table in vertical fluoroscopic position. The unit is also adapted for radiographic use as is illustrated in Figs. 8 and 9, Fig. 9 being illustrative of the shutter and screen assembly, but with the head detached from its support. Fig. 2 shows the packed or stored condition of the unit, as comprising a chest-like structure, whereas Fig. 36 shows a chest, or trunk, having the tube head, control apparatus and accessories therein—the trunk being illustrated in closed position in Fig. 37. Thus, the entire unit may be packed in two containers which may readily be handled for transportation purposes.

Referring first to the assembly of Fig. 1, the apparatus includes a box-like member 5 which constitutes a base upon which the unit is supported. The base may also comprise the body portion of the chest, the lid of which may comprise the front panel 8 which is adapted to be clamped to the base, as by hasps 9. When assembled, as is shown in Fig. 1, the base has a bottom wall 11, side walls 12 and 13 and end walls 14 nd 15 respectively. The side walls support rails 16 and 17 (Fig. 22) which provide a trackway for a carriage 20, which is movable lengthwise of the base and which, in turn, carries rails 21 for supporting a crosstravel carriage 22, upon which the tube stand is mounted.

The tube stand includes an articulated mast which comprises a lower section 23 and an upper section 24, which are hinged intermediately at 25 (Fig. 11), so that the mast may be folded when removed from the carriage and stored within the chest. When erected, the mast sections may be locked in extended position by means of a latch 26.

The base also supports the table which is illustrated as having a leg frame 30 at the front end and a leg frame 31 at the foot end, these being unitary structures which are hinged to the front panel at 32 and 33 respectively for folding against the front panel as is illustrated in Fig. 5. In use, the leg frames are swung outwardly, as is shown in Fig. 6, and are anchored to the base by wing bolts 34 and 35 respectively. The table framework is completed by the insertion of a detachable rail 36 which, as shown in Fig. 7, cooperates with a rail 37 on the top edge of the front panel to support a bucky indicated in general at 38.

The table top, in the assembled position, is positioned upon a head end support 41 and upon a foot end support 42 (Figs. 7 and 8), the first of which is fixed to the head end of the table and is slidable along the rails 36 and 37, whereas the foot end support is fixed to the leg frame 31 and carries rollers 43 along which the table is adapted to be slid whenever it is desired that the table be shifted, as from the horizontal position of Fig. 1 to the vertical position of Fig. 3.

The mast has a carriage 45 slidably mounted thereon, and the carriage in turn supports a swivel arm indicated in general at 46, which carries a screen arm 47, a tube arm 50, and a shutter arm 51. In practice, the swivel arm may be disposed in the position of Fig. 1 for use in horizontal fluoroscopic position, or as shown in Fig. 3 for vertical fluoroscopic position, or as illustrated in Figs. 8 and 9 for radiographic position. The weight of the carriage 45 and of the swivel arm and its associated equipment may be counterbalanced by a spring 29 within the lower section of the mast, the connection including a cable 39 which is adapted to pass around the hinge 25 (Fig. 14) whenever the mast is folded for storage.

The tube stand mast, when in use, is supported upon the cross-travel carriage 22, preferably by a roller 18 (Figs. 11 and 13) which engages a ring 19, and is detachably mounted thereon so as to be removable and storable within the base. In like manner, the screen 48 and head 52 may be removed from the swivel arm 46, and the swivel arm, in turn, may be detached from the carriage 45 to facilitate storage purposes. The roller 18 takes the vertical thrust of the mast and its associated equipment, but the mast is centered by a pin 57 which fits into a socket member 58. Suitable radially extending depressions 59 serve to receive the roller and thereby to hold the mast in a pre-selected position.

The front panel 8 is shielded to protect the operator against scattered radiation, but the back of the table underneath the rail 36 is open whereby the tube and shutter assembly may be positioned underneath the top as is shown in Fig. 1, and may be moved as a unit with the screen, either longitudinally or transversely of the top, within the limits of carriage travel within the base. Moreover, the construction is such that upon rotating the mast until the tube and shutter arms clear the table, then the swivel arm and the units carried thereby may be raised and manipulated, either for use in the position shown in Figs. 8 and 9 or in the position indicated in Fig. 3.

In Fig. 36, we have shown a trunk-like chest 65 which has partitions therein, dividing it into compartments suitable for receiving the tube head, the control equipment and accessories.

To dismantel and pack the apparatus, the cables 60 and 61 (Fig. 3) are removed, coiled and placed within a compartment 62 of the trunk 65. The control box 66 may be placed within the compartment 67 and a collapsible stand 68, if utilized as an optional accessory for the control box, may be placed within the lid 69 of the trunk. Where the stand is not furnished, the control box may be supported upon the chest 65, as is shown in Fig. 3. The hand timer 70 and foot switch 71 may then be disconnected and placed within a compartment 72, the cone on the head having been first removed and placed within the compartment together with the timer and foot switch.

Continued dismantling is accomplished by rotating the mast until the X-ray head 52, screen 48 and shutter arm extend towards the rear, whereupon the carriage 45 is raised to its maximum height, as is shown in Fig. 11, and then the swivel arm is rotated to a horizontal position, this being the safest position in which to remove the head, the shutter assembly 56 and the screen arm 47. The head may then be packed within the compartment 73 and securely fastened to a cradle therein. The head may be held in place by means of a saddle 74, which is provided with springs 75 to protect the head against damage in shipment whenever the lid is closed. Other miscellaneous items such as gloves 76, goggles 77, apron 78, and spare parts box 79 may be stored in compartments and held down securely with a strap 80. The chest can then be closed and the lid securely fastened.

The table components are disassembled and packed by disconnecting the shutter assembly, removing the screen and hanger, and then lifting the swivel arm 46 out of engagement with the carriage 45. The swivel arm may then be placed in its packing position within the base, as shown in Fig. 8, with the tube supporting arm 50 extending along the side wall 12. The swivel arm is then anchored in place by means of a wing bolt 81 and a yieldable latch 82.

The swivel arm retaining latch 82 is shown in greater detail in Figs. 25 and 26 as comprising a pair of supporting arms 95 and 96 which are pivotally mounted upon a rod 97, the latter of which is journalled within a bracket 98 attached to the bottom panel 11. The arms 96 and 97 support a rod 99 which, in turn, slidably carries a sleeve 100 which is biased in a direction toward the bottom panel by means of a spring 101. The arm 50 carries a lug 102 which has an open slot 103 into which the rod may extend, whereby the sleeve will yieldingly abut against the lug and hold it securely in place. The top of the rod 99 may be provided with a head 104 which is adapted to be engaged by the top 40 at a later step in the packing operation.

The carriage and mast assembly is then moved to the head end of the base adjacent the wall 15 and anchored thereto by a pin 27 which extends through a corner gusset plate 28. Then, with the mast carriage at the top, the hinge lock 26 is unlatched and the mast is folded about the hinge 25 to the position shown in Fig. 14, whereupon the folded sections are fastened together by means of a strap indicated at 83 in Fig. 7.

Reference to Fig. 24 will show that the bottom of the base has attached to it three transversely extending guide members 85, 86 and 87 respectively, each of which is an inverted channel-shaped member as is shown in Figs. 19 and 20 respectively. Each of the guides is adapted to receive and support a batten or packing support indicated in general at 88 (Fig. 10), 89 (Fig. 17) and 90 (Fig. 18). These various supports provide cradles and clamping devices by means of which the various parts of the unit are securely fastened into place.

The packing support 88 carries a pair of rubber strips 91 upon which the screen is adapted to rest and each strip is backed by a strap 92, by means of which the screen may be securely anchored in place. The screen, with its hanger, is shown in clamped position in Fig. 7. It is to be noted that the rubber strips 91 are in contact with the screen, whereas the hanger has the end of its arm supported by a rubber covered stud 93 (Fig. 8) on the packing support 89.

The screen packing support 88 may be positioned upon the guide strip 85 by virtue of the fact that the member 88 includes a channel-shaped base strip 105 which fits over the strip 85, and which has a tongue 106 that is adapted to enter a passageway, which is formed at the end of the strip 85 adjacent the wall 13 of the base, by means of a bracket 107 which is fixed to the strip 85, as is shown in Fig. 31. When the screen is clamped in place by the straps 92, one of the trunnions 108 (Fig. 7) of the screen frame rests within a slot in a bracket 109 on the strip 88, and the hub 110 of the screen hanger is pushed onto a stud 93. The stud is attached to an arm 111 which, in turn, is fixed to the packing supporting strip 89.

The packing supporting members 89 and 90 are removably fastened to guide strips 86 and 87 respectively. This is best shown in Figs. 17 and 18, wherein the packing support 89 is fastened by wing bolts 112 and 113, and wherein the packing support 90 is fastened by wing bolts 114 and 115. The packing support 89 has a strip extending upwardly and longitudinally thereof to provide compartments or cradle spaces 116, 117, 118 and 119 respectively, and similarly, the packing support 90 has a strip extending upwardly and longitudinally thereof to provide compartments 120, 121, 122 and 123 respectively. (Figs. 17 and 18.)

The folded mast is lifted out of its bearing 19 within the carriage 22 and is laid across the packing supports 89 and 90 within the compartments 116 and 120 respectively. It is then clamped by plates 126 and 127, which are suitably hinged at 128 and 129 to the packing supports 89 and 90 respectively. The end of the mast which fits into the cross travel carriage is indicated at 124 (Fig. 7) as being clamped to the supporting member 88 by means of a clamping plate 132. A stud 133 (Fig. 10) fits into an opening in the end portion 126 of the mast and holds it against shifting with respect to the strip 88.

The shutter assembly when packed within the base (Figs. 7, 8, 17 and 18) has one end of the arm 51 resting within the saddle compartment 117 in the packing member 89, and the other end within the saddle compartment 121 in the packing member 90. In Fig. 8 the shutter control cable 130 is shown as being looped around the packing member 89 and as having its end portion attached to the base wall 12 by a securing member 131.

The packing members 89 and 90 are also utilized for storing the table support 41 which may be disposed within the saddle compartments 118 and 122 while the support 42 may be disposed within the saddle compartments 119 and 123 respectively. Suitable clamping plates 135 and 136, on the packing supports 89 and 90 respectively, operate to hold the members 41 and 42 in proper position.

The bucky 38 may be stored within the base above the packing supports 89 and 90, between corner pads 140 and 141 (Fig. 17) on the clamping plates 126 and 135 respectively, and other corner pads 142 and 143 on the clamping plates 127 and 136 respectively. When placed in position upon the pads, the top of the bucky will lie substantially flush with the superimposed top 40 (Fig. 5), and thus be held securely in position.

The tubular bucky rail 36 may next be removed from the table leg frames by rotating it until a flat spot 145 thereon (Fig. 29) is in registration with a narrow slot 146 in a plate 147, the latter of which is attached to the top rail of each leg frame, whereupon it may be stored within clips 150, which are provided on the underside of the table top 40. The inverted top is then placed upon the base (Fig. 5), the leg frames are folded against the front panel 8, and are held thereagainst by pins 151, and 152 respectively. Thereupon, the front panel is laid over the top—with the leg frames facing downwardly, and then the panel is clamped to the base by the hasps 9 as is shown in Fig. 2. If a compression band is used, it may be stored within the leg frame 31, as indicated at 155 in Fig. 5.

One feature of the table top assembly is the fact that the top can be readily shifted from horizontal to vertical position or, can be maintained at any angular position as desired. Thus, in Figs. 4, 33 and 34, the table is shown as having side rails 160 which are adapted to receive the rollers 43 journalled in the foot-end support 42. The head end of the table then has a bearing block 162 which is adapted to slide along the rail 36 and has a channel-shaped claw 165 which embraces the rail 37 on the front panel. A notch 166 adjacent the mid-portion of the rail 37 allows the claw 165 to pass therethrough so that the table may be tipped about the axes of the rollers 43.

To lock the table in horizontal position, we have shown a lift pin 168 (Fig. 33) the handle of which projects through a slot 169 on one end of the head support 41, and which is adapted to pass through registering openings in the support 41, the claw 165 and the rail 37. The table may be locked in vertical position by means of a latch 170 (Fig. 38) which is pivotally mounted at 171 on the table top flange 172, and which is adapted to engage behind a flange 173 on the front panel. A spring 174 urges the latch into locking position, but release may be accomplished merely by swinging the top 40 laterally in the direction of the arrow 175 (Fig. 3). This will move the latch laterally to the broken line position 170A of Fig. 38.

An advantage of the present invention is that an X-ray unit has been provided which is light in weight and yet is rigid in either packed or assembled condition. There are only two carrying or shipping units, each of which comprises substantially a parallelepipedon, and these, when loaded, may be readily handled for field use. Moreover, the parts are capable of being assembled or disassembled without the need for tools.

A further advantage of the present invention is that the X-ray unit is quickly adaptable to all standard techniques which are desirable for field units, including either horizontal or vertical fluoroscopy or radiography.

We claim:

1. An X-ray apparatus, comprising a hollow box-like base member, a carriage supported thereon for movement longitudinally thereof, a cross-travel carriage mounted for movement on the first carriage, a tube stand detachably carried by the cross-travel carriage, said tube stand including an articulated mast adapted to be folded intermediate its ends for storage, a carriage slideably mounted for longitudinal movement along the mast, a swivel arm mounted on said last mentioned carriage, a tube head, shutter assembly and fluoroscopic screen carried by said swivel arm, said tube stand members being demountable and adapted for storage within said hollow box-like base member.

2. In X-ray apparatus, an X-ray table comprising a front panel, leg frames hinged thereto, a rail connecting the frames, a rigid table top extending the length of the frame and being slidably mounted along the top of said panel and on said rail, means carried by one of the leg frames for pivotally supporting the table top for movement from horizontal to vertical fluoroscopic position, a hollow-box-like member detachably connected to said leg frames, a tube stand, means carried by said member and supporting the stand for movement longitudinally and transversely of the table, the stand including a swivel arm, a tube head and a fluoroscopic screen, said tube stand swivel arm and screen being demountable and adapted to be positioned within said member, and said table being also demountable and adapted to be positioned within said member, said front panel constituting a closure for the member, and means for fastening the panel to the member.

3. A demountable X-ray unit including an X-ray table and a tube stand, a swivel arm, said table including a front panel and a top slidably mounted thereon, and the tube stand including a mast, a slide, a swivel arm carried by the slide, and a screen and shutter assembly mounted on said swivel arm, a box-like support, means for detachably connecting the table to said support whenever the table is assembled, carriage means supporting the tube stand within said support for movement longitudinally and transversely of the table, said box-like support constituting a common packing case for the tube stand, a swivel arm, shutter assembly and screen, and the table being demountable and also being adapted to be stored within said support, the front panel of the table constituting a closure for the support, and means for clamping the panel to the support.

4. A self-storing portable X-ray apparatus comprising in combination, a collapsible table having a rigid top, a demountable tube stand for supporting an X-ray tube in operative position relative to the table, a box-like case having an open side and constituting a base for the assembled table and tube stand, means carried by the case for movably supporting the assembled tube stand, clamping means within the case for storing the disassembled tube stand therein, said table top coacting when disassembled and stored within the case to form a primary retaining closure for the case and its contents, said case having a cover for the open side adapted to removably surmount the disassembled stored table top and form with the case a closed container for its contents, and said cover coacting as a supporting front panel for the assembled table top.

5. An X-ray unit comprising a demountable X-ray table, including a top, a front panel, a supporting rail, and leg frames, an open box-like support detachably connected to the leg frames, a demountable tube stand including a slide thereon, a swivel arm carried by the slide, shutter means and a fluoroscopic screen carried by the swivel arm carriage means mounted on said support for movement longitudinally of said table and removably supporting the tube stand, means for locking the carriage means at one end of the support, and clamping means within the support for holding the disassembled swivel arm, screen, tube stand, shutter assembly and table in stored position within said support.

6. An X-ray apparatus comprising in combination, a base embodying a hollow box-like member, a plurality of clamping members extending transversely of the base and removably mounted thereon, a carriage mounted for movement on the base, an articulated mast detachably supported on said carriage, a slide carried by the mast, a swivel arm carried by the slide and adapted to support a fluoroscopic screen and a tube head, means for locking the carriage at one end of the base, and said clamping means operating to hold the disassembled mast, slide, swivel arm and screen in stored position within said base.

7. A demountable X-ray table including a box-like base, means for detachably supporting the table upon the base, the table including a front panel, leg frames, a connecting rail and a rigid top, the rail being detachably connected to the leg frames and the leg frames being hinged to the front panel, means for holding the rail within the table top when demounted, other means for holding the leg frames against the panel when demounted, the table top having a size sufficient to fit upon the base and the front panel having a size sufficient to overlap the top and to constitute a closure for the case, and means for clamping the panel to the case.

References Cited in the file of this patent

UNITED STATES PATENTS

| | | |
|---|---|---|
| 654,832 | Hathaway | July 31, 1910 |
| 1,337,904 | Greville | Apr. 20, 1920 |
| 1,553,901 | Hynes | Sept. 15, 1925 |
| 1,599,696 | Wantz | Sept. 14, 1926 |
| 1,776,204 | Tascarella | Sept. 16, 1930 |
| 2,049,807 | Horsley et al. | Aug. 4, 1936 |
| 2,434,827 | Akers | Jan. 20, 1948 |
| 2,504,697 | Kearsley | Apr. 18, 1950 |
| 2,556,360 | Clemons | June 12, 1951 |
| 2,572,706 | Eichholz et al. | Oct. 23, 1951 |
| 2,668,912 | Goldfield et al. | Feb. 9, 1954 |

FOREIGN PATENTS

| | | |
|---|---|---|
| 75,771 | Austria | Mar. 10, 1919 |
| 7,926 | Great Britain | Feb. 4, 1915 |

OTHER REFERENCES

Pub. 7b 435A, General Elec. X-Ray Corp., page 2, December 19, 1939.